Feb. 8, 1927.

I. W. NONNEMAN 1,616,542

MACHINE FOR CUTTING PIPE THREADS

Filed Oct. 10. 1921  5 Sheets-Sheet 2

INVENTOR
Ira W. Nonneman,
By Baker & Macklin,
ATTORNEYS

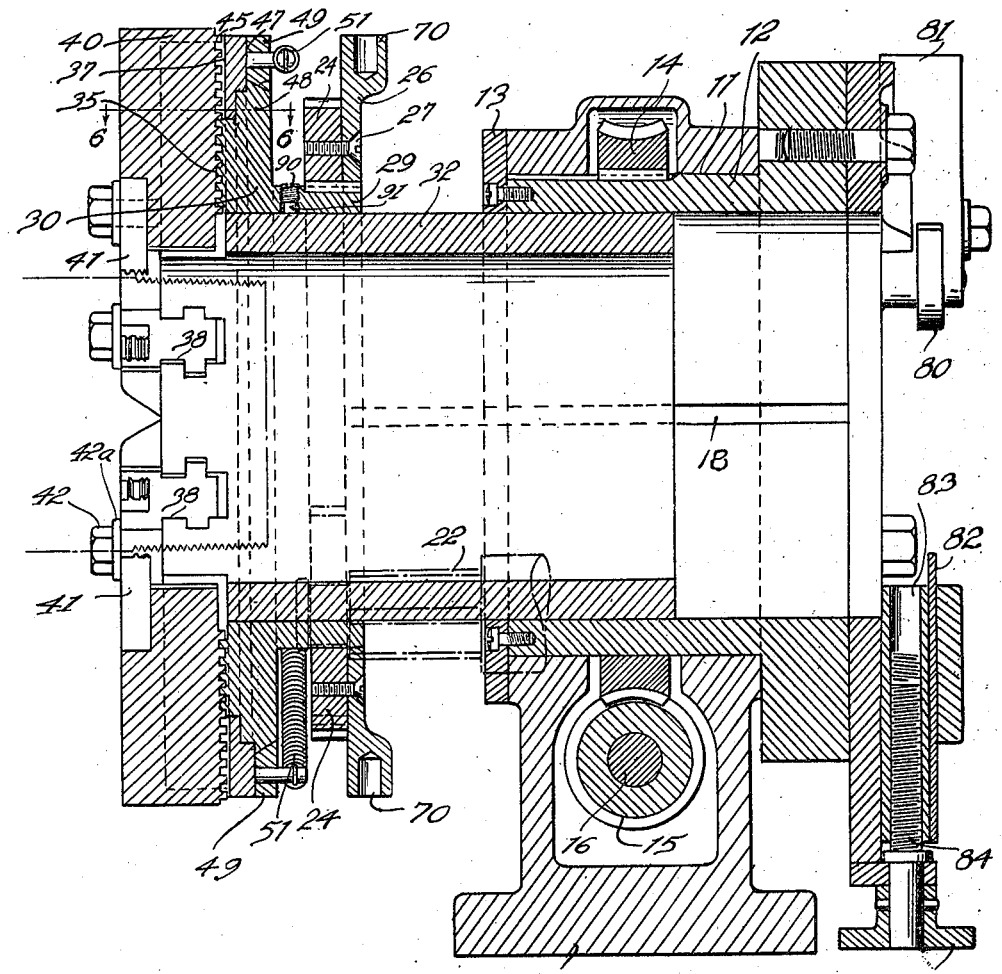
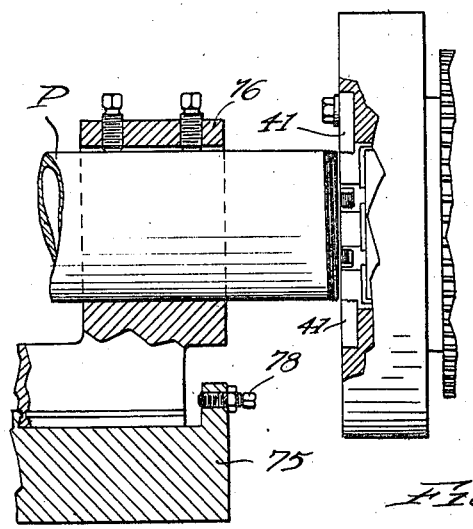

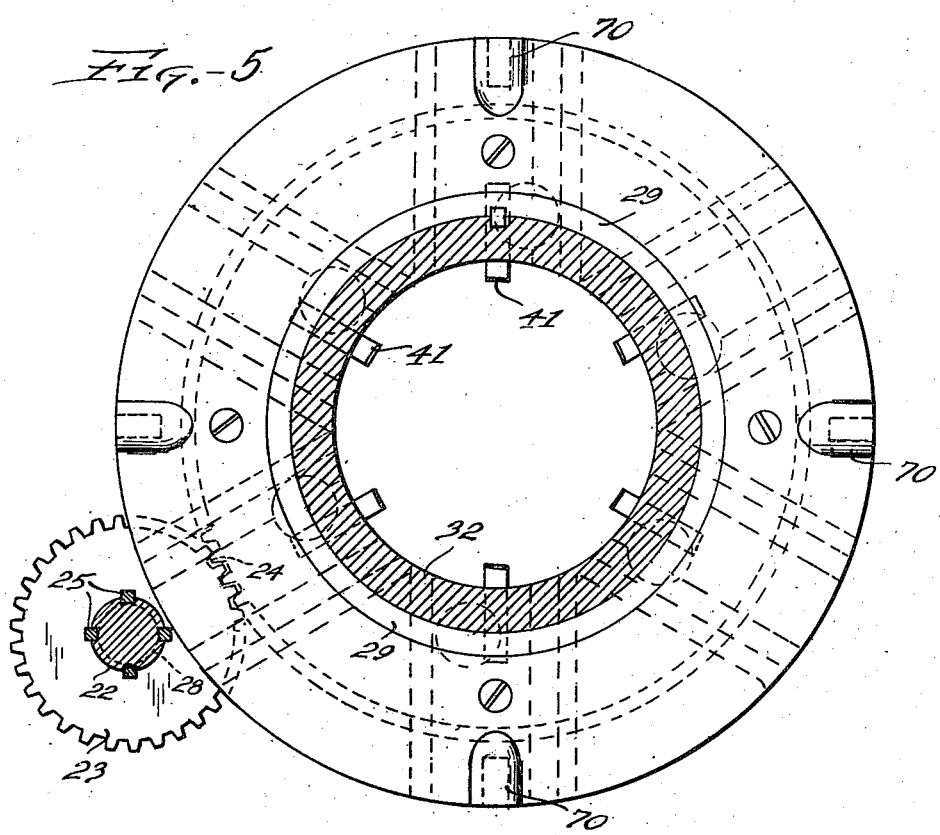
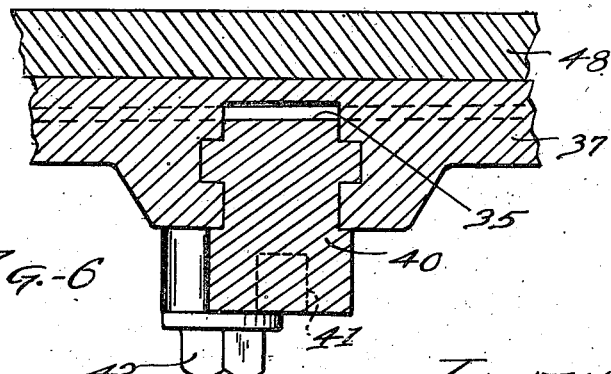

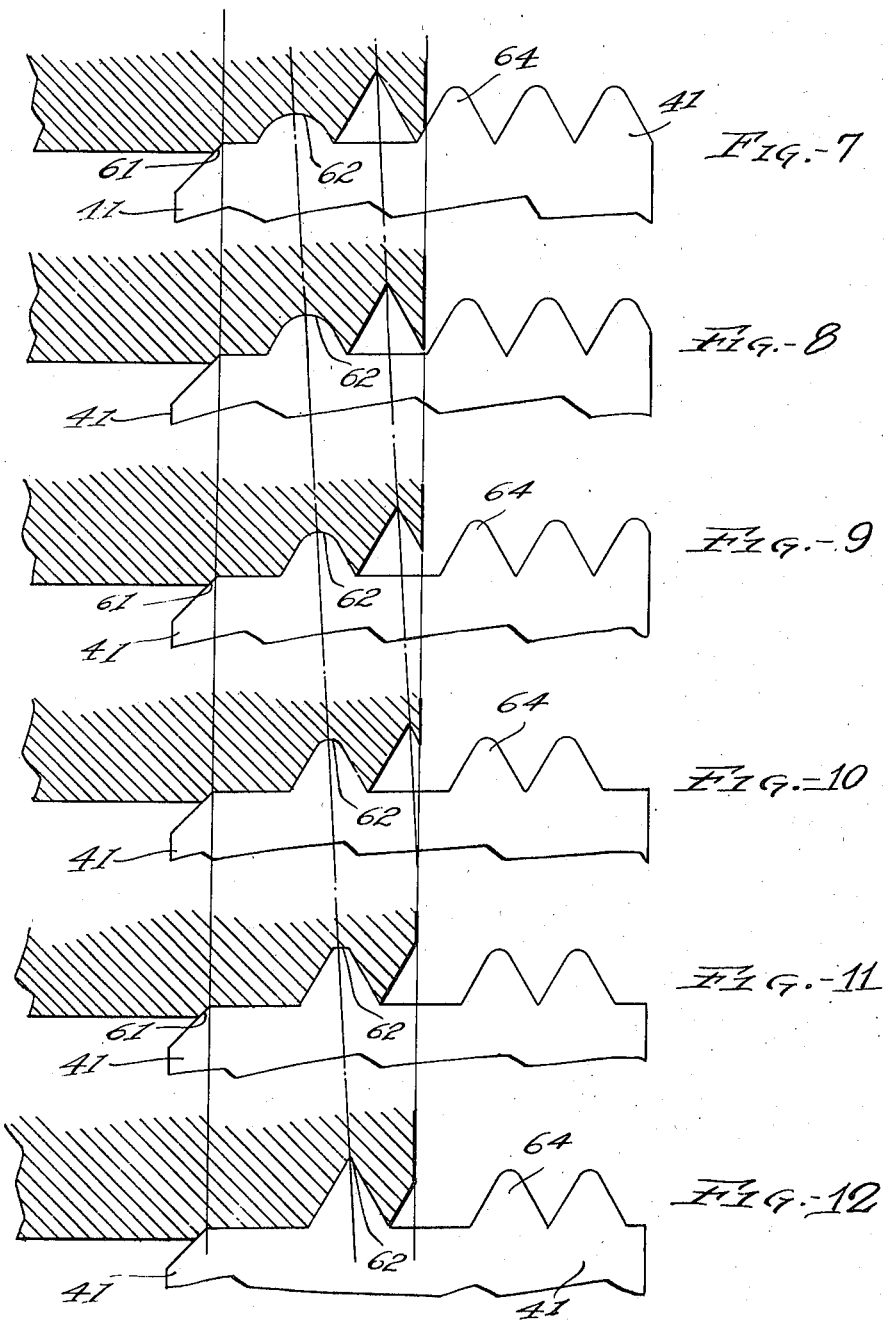

Patented Feb. 8, 1927.

1,616,542

UNITED STATES PATENT OFFICE.

IRA W. NONNEMAN, OF WARREN, OHIO, ASSIGNOR TO THE BORDEN COMPANY, OF WARREN, OHIO, A CORPORATION OF OHIO.

MACHINE FOR CUTTING PIPE THREADS.

Application filed October 10, 1921. Serial No. 506,706.

This invention relates to machines for accurately cutting pipe threads, and has particular reference to a power driven machine in which each thread is cut by the progressive action of a number of chasers.

One of the objects of the invention is to provide a simple and effective machine of the character described having chasers so constructed that in cutting the thread each chaser performs a different and distinct operation, thus progressively deepening the cut for each thread, while at the same time the chasers may recede to produce the desired taper.

A further object of the invention is to provide a machine having a plurality of chasers thereon which are adapted to be rotated, and wherein a vise-like member coacts to first feed the pipe toward the chasers when the initial thread is cut, after which the chasers themselves function to cause the thread cutting portion to advance upon the pipe, the pipe, during such operation, remaining stationary.

Another object of the invention is to provide in such a thread cutting machine, simple means whereby the cutting means moves longitudinally with respect to the work under the control of the chasers themselves, while at the same time these chasers are gradually withdrawn radially to effect the taper.

More specifically, my invention provides means for cutting a thread in which the chaser first acting removes the scale and a thin portion of the surface of the pipe and cuts a groove which has the width of a full thread, but whose depth is slight; then the second chaser subsequently deepens this groove without altering the width and the remaining chasers gradually and progressively deepen the groove without widening it until the final finished thread is produced. Such operation continues relatively for each thread, though the bottoms of successive threads are farther from the pipe axis, by reason of the recession of the chasers.

In the preferred form each chaser has a tooth to cut a portion of one thread while immediately back of the cutting portion is a blank space, and the remainder of the chaser is provided with teeth which run through the cut threads, but which have no cutting action.

Figure 1:
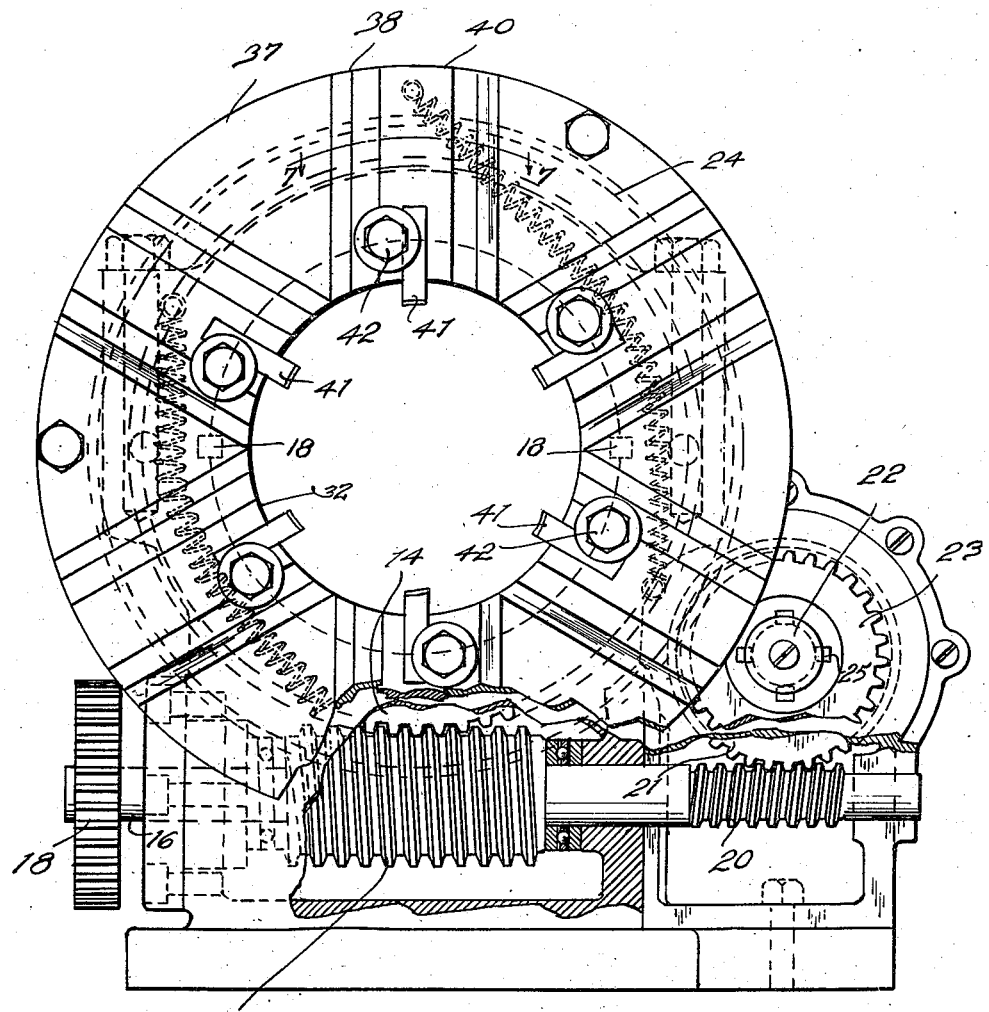
Figure 2:
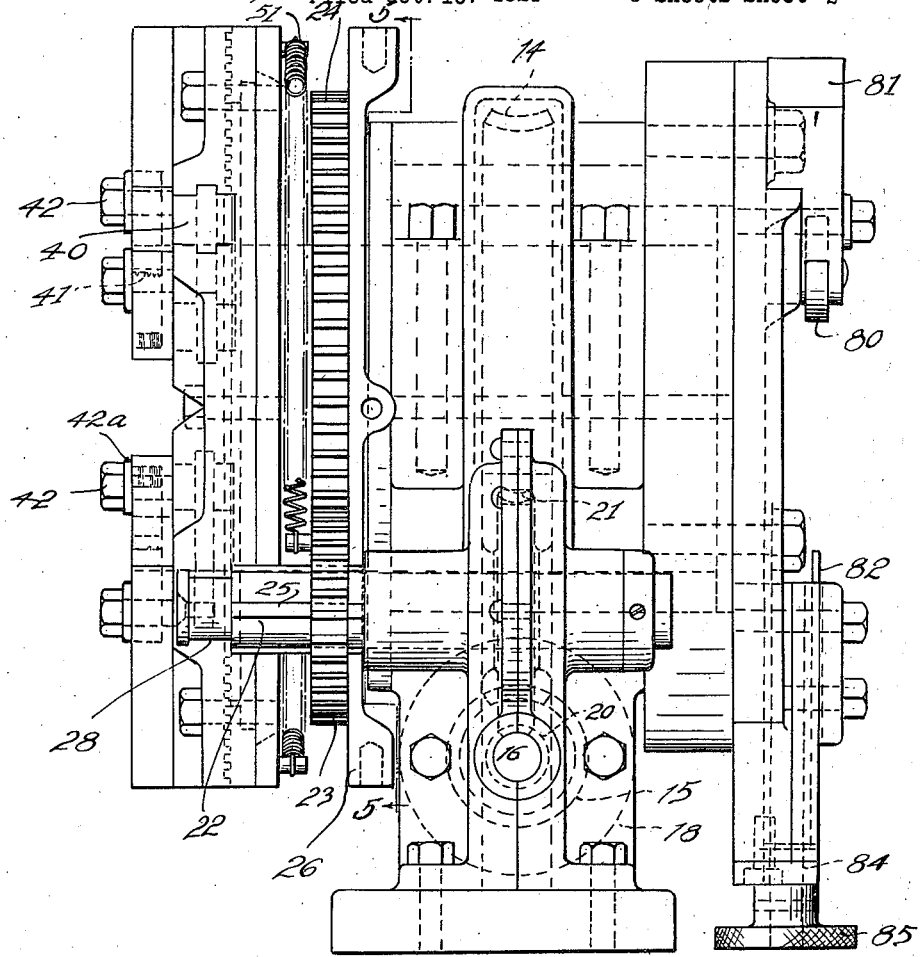

Further features of the invention will be apparent from the following description, taken in connection with the accompanying drawings, wherein Fig. 1 is an end view of a machine constructed according to my invention, parts of the machine being broken away; Fig. 2 is a side elevation of the machine; Fig. 3 is a central, vertical, longitudinal sectional view showing the construction; Fig. 4 is a detail view, partly in section, showing the vise for initiating the threading action; Fig. 5 is a cross section of the machine on the plane indicated by the line 5—5 on Fig. 2 looking toward the head; Fig. 6 is a sectional detail of the head through one of the chaser slides, as indicated by the line 6—6 in Fig. 3. Figs. 7 to 12, inclusive, are fragmentary details of the successive chasers in action, illustrating their operation while cutting a thread on a pipe, according to my invention.

Referring to the drawings by reference characters, I have shown at 10 a standard, the upper portion of which is arranged to form a cylindrical bearing 11 in which a sleeve 12 is rotatably mounted. This sleeve 12 has a worm wheel 14 keyed thereon. The gear 14 is arranged to be driven by the worm 15 mounted on a shaft 16 which in turn is adapted to be driven through a spur gear 18 by any desirable source of power, such as an electric motor. The shaft 16 is further provided with a worm 20 adapted to coact with a worm wheel 21 for a purpose to be presently described. Suitable bearings for the shaft 16 may be provided, as shown.

The worm wheel 21 is keyed to a shaft 22, the latter being shown as provided with a plurality of longitudinal ribs 25 thereon. A gear 23 is slidable upon this shaft 22, this gear being slotted to receive the ribs 25. The gear 23 meshes with another gear 24. A disc plate 26 is shown as secured to the gear wheel 24 by suitable fastening means, such as the screws 27.

It will be noted that the gear 24 is mounted on a cylindrical member 29 having a flange 30 thereon. The cylindrical member 29, as shown, is mounted upon a tubular stem 32 which is arranged to fit within the sleeve 12 and to slide but not rotate independently thereof, by reason of the mutual key and keyway 18. The sleeve 12 is provided with a retaining ring 13 and may be secured thereto by suitable screws or other fastening means.

The flange 30 has in its front face a spirally cut groove forming a scroll 35 for a purpose to be presently described. The tubular stem 32, as will be seen in the drawings, is provided at its outer extremity with a head 37 radially slotted, as at 38, to receive a plurality of chaser holding slides 40.

The number of chaser holding slides may vary to suit different conditions. I have shown six by way of example. Each chaser member 41 is tightly clamped in a slide 40 by means of the bolt 42 and washer 42ª. The rear portion of each slide 40 is provided with spirally cut notches 45, these notches being complementary to the ribs 35 of the scroll on the face of the plate 30.

The spiral rib 35 and the teeth 45 are arranged so that a rotation of the member 30 causes a gradual radial feeding of the slide blocks 40 and a consequential feeding of the chaser members 41. The flange 30 of the member 29 has a shoulder at 47 and this shoulder fits a similar shoulder on the head 37. The outer face of the flange 30 is also beveled, as at 48, to fit a beveled annular ring 49 secured to the head 37, whereby the flange 30 may rotate with respect to the head 37.

The gear ratio between the worm 15 and wheel 14 and that of the gear train including the worm 20, worm wheel 21, pinion 23 and spur gear 24 are different, so that the chaser carrying head and the scroll rotate at slightly different speeds, though in the same direction. This causes a positive recession of the chasers during the cutting operation, to produce a tapered thread.

A spring 51 has one end thereof secured to the ring 49, while the other end is secured to the scroll plate 30. Any number of springs may be used; in the present case I have shown two by way of illustration. Their purpose is to complete the movement of the scroll at the end of the cutting operation to withdraw the chasers clear of the pipe.

In Figs. 7 to 12, inclusive, I show the various stages of the act of cutting a thread on a pipe. It will be noted that each chaser 41 differs from the others in that the cutting portion 62 is a different outline whereby it may make a cut of different depth. In Fig. 8, it will be noted that the fore part 61 of the chaser is shown as removing scale and taking a thin cut from the metal, while the cutting portion 62 has a width substantially the same as that of a finished thread, while the depth of this cutting portion is much less than the depth of a thread and is rounded.

In Fig. 9 the width of the cutting member 62 is unchanged but the depth is increased and a rounded bottom is provided. The taper of the sides from the rounded bottom to the surface, it will be noted, is the same taper as that of a finished thread, and the same is true in Figs. 10 and 11. In Fig. 12, it will be noted that next to the last step consists of squaring out the bottom of the partially cut thread with the sides as far as this squared portion having the shape of a finished thread; while in the last operation shown in Fig. 12 the triangle forming such squared portion is cut out, leaving the finished and complete thread.

Instead of providing a tooth immediately following the cutting portion of the chaser, I prefer to leave a blank space of the width corresponding to the pitch of the thread. This permits manual feeding of the pipe into the head a distance corresponding to the width of two threads, before the automatic feeding of the head onto the pipe begins, and avoids danger of injury to partially cut threads, which might otherwise result by subjecting them to the longitudinal stress caused by the thread itself pulling the chasers along the pipe. Following this blank space I provide the teeth 64 continuing as far as desired. These last teeth, it will be noted, are not intended to perform the function of cutting nor working on the stock at all and their only function is to cause the rotating cutter to follow the cut threads and thus automatically advance the cutting head while the pipe remains stationary.

In cutting threads it is desirable that the threaded portion gradually taper from the end of the pipe outwardly, and this I accomplish by means of the described scroll device whereby, as the cutting operation is performed, the chasers are gradually moved outwardly so that the finished cut results in a tapered thread.

In position adjacent the front of the machine I may arrange a suitable vise member 75 which may include a fixed base having an apertured slide 76 thereon. Suitable means may be provided in this slide for engaging the pipe and the slide may be either hand operated or machine operated as desired. The pipe held by the vise, as shown in Fig. 5, is in position to be acted upon by the cutting members 41 as will now be described.

In operation, the pipe to be threaded is placed within the gripping members of the sliding block 76 of the vise. The vise in this position will be at its rearward limit of movement so that the end of the pipe will substantially abut the cutting members 41. To cut the thread, assuming that the machine is in operation, the vise members operate to bring the pipe towards the chasers which thereupon begin their cutting action. This results in the cutting portion 62 of the chasers 41 initiating the cut and making at least one complete thread upon the pipe.

The limit of movement of the vise towards the chasers is such that as soon as approximately two complete threads have been cut by the chasers, the vise reaches its limit of movement which is controlled by the set screw 78. As soon as this takes place the relative feeding of the work to the cutter is continued by the chaser head moving along the pipe, this being caused by the non-cutting teeth 64 on the chasers entering the previously cut threads.

It will be apparent from an inspection of Fig. 4 that the rotation of the stem 32 causes the cutting members 41 to rotate and that, at the same time the stem moves axially, due to the feeding action of the chasers, on the work, the stem being prevented from rotating independently during this action by reason of the fact that it is splined in the sleeve 12. During this operation the sleeve 29, carrying the flange 30 is being rotated by means of the gears 23 and 24. The arrangement of these gears is such however, that the rotation of the sleeve 29 differs slightly from that of the stem 32, the differential action causing a slight relative rotational movement of the two members, as already explained. This causes the scroll to move the cutters 40 away from the work as they advance along the pipe and results in a tapered thread being cut.

The gear 23 is splined on the shaft 22 and is moved along this shaft by the plate 26 which extends behind it until a reduced cylindrical portion 28 of the shaft 22 is reached. At this point the gear wheel 23 slides off the shaft 22 onto the reduced portion and consequently then ceases to be driven, leaving the gear 24 free to turn.

As previously described, springs 51 are fastened to the ring 49 at one end and to the gear wheel 44 at the other end, and during the operation of threading these springs remain under tension which, however, is gradually but not entirely reduced as the chasers recede. When the gear 23 ceases to drive the gear 24 the tension of the springs cause the scroll to be revolved and thus causes the chasers 41 to be withdrawn clear from the work; and the threading operation is thus completed.

After the threaded work has been removed, the stem 32 is pushed back into the sleeve 12 and a suitable pin having been inserted in one of the sockets 70 on the disc 26, the latter is turned to again tension the springs 51 and to bring the chasers to initial position. While the springs are thus tensioned the gear wheel 23 is slipped onto the shaft 22 and caused to key thereto as well as to mesh with the teeth 24, so that the machine is ready to repeat the operation.

If it be desired to use the mechanism to cut a non-tapered thread, this may be readily accomplished by locking the scroll to the chaser head. Any suitable expedient may be employed for this purpose, as for instance a set screw 90 (Fig. 4) mounted in the scroll sleeve 29 and adapted to force a plug or shoe 91 into binding engagement with the tubular stem 32.

From the description given it will be seen that my machine, while simple in construction and capable of rapid operation, is adapted to cut a thread very accurately both as to the form of the thread and as to the pitch. The cuts made by the successively acting chasers may each be to a comparatively slight depth so that the surface of the thread is left very smooth. This, coupled with the preliminary action of removing the scale and slightly turning off the surface cylindrically, produces work accurate and uniform to a high degree.

I claim:

1. In a machine for cutting threads the combination with a chaser carrying frame, of chasers each having a cutting tooth and each a non-cutting tooth adapted to occupy a cut thread, the cutting teeth which act in the same convolution being successively radially deeper on successive chasers.

2. In a machine for cutting threads the combination of a rotary frame having an opening, a series of chasers arranged about the opening, successive chasers each having a tooth adapted to cut on the same thread and such teeth on successive chasers which act in the same convolution cutting progressively deeper radially, and non-cutting teeth on the chasers.

3. In a machine for cutting threads the combination with a chaser carrying frame, of chasers each having a cutting tooth and each a non-cutting tooth adapted to occupy a cut thread, the cutting teeth on successive chasers in the same circumferential row being successively deeper without being wider and the non-cutting teeth on successive chasers being alike.

4. In a machine for cutting threads the combination of a rotary frame, a series of chasers arranged about the axis thereof, successive chasers in the same circumferential row each having a tooth adapted to cut on the same thread and such teeth on successive chasers cutting successively deeper but all of the same width, and non-cutting teeth alike on the chasers.

5. In a machine for cutting threads, the combination of a chaser carrying frame and a chaser carried thereby and having a cutting tooth and a non-cutting tooth separated from the cutting teeth by a distance at least as great as the pitch to be cut.

6. In a machine for cutting threads the combination of a chaser carrying frame and a plurality of chasers arranged to cut to an increasing depth successively, each chaser having a non-cutting tooth separated from its cutting tooth by a toothless space.

7. In a machine for cutting threads, the combination of a rotary chaser-carrying frame and a plurality of chasers carried thereby and arranged to cut to an increasing depth successively, each chaser having a cutting tooth and a non-cutting tooth separated from its cutting tooth by a distance equivalent to the pitch of the thread to be cut.

8. A thread cutter comprising a plurality of chasers circumferentially arranged to cut to successively increasing depth in the same thread convolution, and non-cutting teeth separated from the cutting teeth by a distance corresponding to the pitch of the thread to be cut.

9. In a machine for cutting threads, the combination with a stationary support of a rotary member mounted therein, a chaser carrying head having an extension slidably mounted in said member, chasers carried by the head and having cutting teeth adapted to act simultaneously in the same thread groove to a successively increasing depth, said chasers having non-cutting teeth following their cutting teeth whereby the chasers may feed themselves and the head onto a pipe being threaded, and means for holding such pipe and initially feeding it to the chasers.

10. The combination of a rotary head, chasers mounted therein and provided with cutting teeth and non-cutting teeth, the cutting teeth on successive chasers cutting to an increased depth in the same thread groove, a scroll plate coacting with slidable blocks carrying the chasers and adapted to move the chasers outwardly during the cutting, and means for preventing movement of the scroll plate relative to said slidable blocks whereupon said chasers will cut a straight thread.

In testimony whereof, I hereunto affix my signature.

IRA W. NONNEMAN.